Dec. 8, 1953 J. W. MOORMAN ET AL 2,662,050
CATALYTIC CONVERSION OF HYDROCARBONS
Original Filed Nov. 29, 1947

INVENTORS
JOSEPH W. MOORMAN
LOUIS J. KELLY
BY E. F. Liebrecht
Cruzan Alexander
ATTORNEYS Patented Dec. 8, 1953

2,662,050

UNITED STATES PATENT OFFICE 2,662,050

CATALYTIC CONVERSION OF HYDROCARBONS

Joseph W. Moorman, Alpine, and Louis J. Kelly, Tenafly, N. J., assignors to The M. W. Kellogg Company, Jersey City, N. J., a corporation of Delaware Continuation of application Serial No. 788,905, November 29, 1947. This application March 16, 1949, Serial No. 81,814

3 Claims. (Cl. 196—50)

The present invention pertains to improvements in the regeneration of used catalytic and similar contact materials which become spent or inactive during the course of their use by the deposition of a combustible deposit thereon. More particularly, the invention pertains to improvements of this character in the catalytic conversion of hydrocarbons by a continuous cyclic process wherein solid particles of a catalytic material and vapors of the hydrocarbons undergoing conversion are contacted in a conversion zone, spent catalyst particles are separated from the vaporous conversion products, and thereafter regenerated for reuse by contacting them with an oxygen-containing gas under suitable conditions to cause combustion of the carbonaceous deposit thereon.

Heretofore, various processes have been proposed for effecting regeneration operations of this type. Because of the highly exothermic character of the combustion reaction involved, and the sensitivity of the catalytic materials at high temperatures, the provision of a satisfactory regeneration process has been attended with many difficulties. Furthermore, conversion reactions of this type are necessarily practiced commercially in units of considerable size and capacity, and accordingly the problem of minimizing the size and cost of the equipment necessary is of outstanding importance.

The primary object of the present invention is the provision of a regeneration process wherein the temperature of the regeneration operation and rate of combustion may be readily and satisfactorily maintained within desired limits, and one which may be practiced in apparatus substantially reduced in size and consequent cost of construction compared to the necessary apparatus in procedures heretofore proposed.

Prior to the present invention, it has been proposed to effect the regeneration of a spent powdered or finely-divided cracking catalyst, and similar materials, by a procedure involving suspending the catalyst particles in an oxygen-containing gas and passing the suspension through a regeneration zone under conditions adapted to cause combustion of the deactivating deposit of carbonaceous material. It has been further proposed, in connection with this method, to control the temperature of the regeneration zone by recycling a portion of the regenerated catalyst thereto after cooling this portion to a suitable temperature in a cooling zone extraneous of the regeneration zone. The quantity of cooled recycled catalyst necessary in this instance is dependent upon its temperature, and decreases with decrease in temperature of the cooled recycled catalyst stream. However, in the application of this previously proposed method a lower-temperature limit to such cooling and consequent minimum amount of recycle necessary has been recognized and established, this lower limit being based upon the recognition that combustion of the carbonaceous deposit will not occur below the ignition temperature, and accordingly the latter temperature has been established as the practical lower limit for the extent of cooling of the recycled catalyst stream.

The present invention involved the discovery that by the maintenance of certain specified conditions in the regeneration zone the cooled stream of catalyst particles introduced for temperature control in the regeneration zone may be cooled to a relatively low temperature, suitably below the ignition temperature of the carbonaceous deposit, without subcooling of the regeneration zone to a point when combustion would either cease or proceed at an unsatisfactorily low rate. The principles underlying the invention may be applied in various modifications involving the maintenance of the required temperature control of the regeneration reaction by (a) cooling a stream of recycled regenerated catalyst, (b) cooling a portion or all of the stream of spent catalyst to be regenerated, or (c) a combination of (a) and (b). In the practice of the process in all modifications, an oxygen-containing gas is passed upwardly through the particles of catalytic material in the regeneration zone at a velocity sufficiently low to cause a relatively dense and concentrated catalyst phase to form in the regeneration zone and at a sufficiently high velocity to produce a high degree of turbulence of the particles in the dense phase, with a consequent maintenance of a substantially uniform temperature throughout the dense phase.

Various other specific features, objects, and advantages of our invention will be apparent from the following detailed description of illustrative examples of its practice, given in connection with the appended drawing, wherein:

Fig. 3 is a diagrammatic illustration of a modified form of apparatus for the practice of the embodiment of the invention involving the cooling of a recycled stream of regenerated catalyst.

Figure 2:
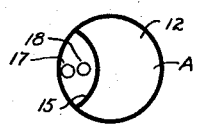
Fig. 2 is a sectional view taken along line II—II of Fig. 1.

Following the process flow illustrated in the drawing, a suitable feed stock, for example, a high boiling hydrocarbon fraction such as a reduced petroleum crude, gas oil, or the like, is introduced through line 1 by pump 2 into heating coils 3 in furnace 4 wherein it is vaporized and heated to a temperature approximating that required for the subsequent conversion operation. In the case of a reduced crude charging stock a portion of the feed as discharged from the furnace will remain unvaporized. Steam may be suitably introduced into the furnace coil at intermediate points through lines 5 to facilitate vaporization, and sufficient pressure is maintained in the furnace oil outlet to prevent coking of the coil. From furnace 4 the heated charge passes by transfer line 6 to the base of a regenerated catalyst standpipe 7, or other suitable source of active catalytic material. From standpipe 7, a hot active catalyst is introduced at a rate controlled by valve 8 into the feed mixture, the heat content of the regenerated catalyst stream being sufficient to vaporize the oil, provide the heat of cracking by superheating the vapors and to discharge the products from the reactor at the desired end conversion temperature, for example about 950° F. In the case of a reduced crude charging stock, the vaporization of the oil at this point includes a partial decomposition or cracking of this non-volatile component of the feed. Additional steam may suitably be introduced through line 9 to form a gaseous suspension with the catalyst discharged through valve 8. The mixture of catalyst particles and vapors passes through line 10 into inlet 11 into the lower part of reactor 12. Reactor 12 is a vessel in the form of a cylinder or other suitable shape having a relatively great cross-sectional area compared to the cross-sectional area of the vapor inlet line 10, and these relative proportions cause a corresponding reduction in the velocity of the vapors after their passage from inlet line 10 into the reactor 12. The velocity of the vapors in reactor 12 preferably is maintained within such limits as to produce therein a highly turbulent and concentrated or dense phase of the catalyst, similar to the condition maintained in zone A' of the regenerator. However, any conditions adapted to produce suitable contact between the catalytic particles and the vapors undergoing conversion may be utilized in the conversion zone with reference to the practice of the present invention.

The dense turbulent catalyst phase (zone A) extends only partially up the reactor, the upper horizontal level thereof being indicated by dotted line 13. Zone B, the reactor space above this level 13, constitutes a catalyst-vapor disengaging space, a relatively small proportion of the total catalyst introduced being carried out overhead with the vaporous conversion products from zone B through vapor outlet line 14. Unused or spent catalyst suitably is withdrawn from the conversion zone by a catalyst withdrawal passageway 15 opening directly into the dense catalyst phase in zone A. The relative cross-sectional areas of catalyst outlet 15 and reactor 12 are shown by Fig. 2. A suitable inert gas such as steam is introduced in the lower portion of the catalyst withdrawal passageway 15 through line 16 to displace or strip hydrocarbon vapors mixed or entrained with the separated catalyst and to maintain the catalyst therein in an aerated flowable condition. Catalyst is withdrawn from passageway 15 in two streams through catalyst standpipes 17 and 18 to which an inert aerating medium is supplied by means of suitable inlet lines (not illustrated) distributed at suitable intervals along their length to maintain the catalyst flowing therethrough in a dense but readily flowable state.

The vaporous conversion products containing a relatively small proportion of the total catalyst fed to the reactor, that is an amount of the order of about 15 per cent or less, pass overhead from zone B through outlet 14 to a suitable gas-solid separating system. This separating system may consist of any one of various available means for separating the suspended catalyst, and returning it to the system. The catalyst thus recovered may be returned directly to the reactor, or optionally to the stripping zone in catalyst outlet 15. As shown, this system comprises a plurality of cyclone separators 19 and 20 arranged in series, in each of which a portion of the catalyst is separated from the vapors and withdrawn through the lower hopper, the separated vapors being withdrawn overhead and passed to the subsequent separating stage. The catalyst is withdrawn from the hoppers through tailpipes 20 and 21 which preferably extend as indicated into the reactor a short distance below the upper level of the dense catalyst phase. Tailpipes 20 and 21 likewise may be suitably provided with inlet lines distributed at suitable intervals along their length for introducing an aerating medium thereto to maintain the catalyst passing therethrough in a flowable condition. The vaporous conversion products withdrawn from the final cyclone through line 22 are passed to a suitable products recovery system such as a fractionating tower or the like, wherein the products are separated into the desired fractions, such as gasoline, fuel oil and cycle oil. The small amount of catalyst remaining in the vapors withdrawn through line 22 may be recovered by partially condensing these vapors, thereby concentrating this residual catalyst in the heavy boiling condensate which may be recycled to the reactor through feed line 1, as described in Belchetz Patent No. 2,374,073.

In appended Table I there is given an illustrative example of suitable dimensions for reactor 12 and operating conditions for the conversion of a reduced crude petroleum oil over a powdered alumina-silica type of cracking catalyst of the activated clay "Super-Filtrol" variety, into low boiling constituents consisting of a large proportion of low boiling hydrocarbons within the gasoline boiling range and characterized by their high octane value. In this particular case the reactor was designed to process 16,000 bbls./day of a Mid-Continent reduced crude having a gravity of 23 degrees A. P. I. to produce the following products in the yields indicated:

10# R. V. P. gasoline_____vol. %__ 42.5
No. 3 heating oil_____vol. %__ 11.7
Heavy gas oil_____vol. %__ 32.8
No. 5 fuel oil_____vol. %__ 7.2
Excess butane_____vol. %__ 5.5

Dry gas _____ wgt. % __ 6.5
Coke _____ wgt. % __ 4.2

TABLE I

| | |
|---|---:|
| Reduced crude oil feed, bbls./day | 16,000 |
| Steam feed, wt. % based on oil feed | 10 |
| Reactor dimensions: | |
|   (a) Zone A—ht.—ft | 18 |
|       Zone A—dia.—ft | 19.5 |
|   (b) Zone B—ht.—ft | 8 |
|       Zone B—ht.—ft | 19.5 |
| Feed wt. ratio of catalyst to oil | 7.5:1 |
| Oil-vapor mixture temperature (from furnace outlet), °F | 900 |
| Regenerated catalyst temperature (standpipe 7), °F | 1050 |
| Catalyst average concentration, | |
|   (a) Zone A, lbs./cu. ft | 15.7 |
|   (b) Zone B, lbs./cu. ft | 1.0 to 1.5 |
|   (c) Catalyst draw-off line 15, lbs./cu. ft | 18.5 |
|   (d) Vapor line 22, grains/cu. ft | 6 |
| Vapor Velocity, | |
|   (a) Zone A, ft./sec | 1.5 |
|   (b) Zone B, ft./sec | 2.06 |
| Oil contact time (average), seconds | 10 |
| Catalyst contact time (average), seconds | 156 |
| Ratio of weight of oil fed/hr. to wt. of catalyst in Zone A | 3.09 |
| Reactor vapor outlet temperature (Zone B), °F | 945 |
| Reactor pressure, | |
|   (a) Inlet to Zone A, lbs./sq. in. gauge | 10.0 |
|   (b) Outlet from Zone B, lbs./sq. in. gauge | 8.0 |

Referring now to the regeneration stage of the cyclic operation, the spent catalyst is preferably passed to the regenerator in two separate streams withdrawn through catalyst standpipes 17 and 18, one of these streams being cooled while the other is passed to the regenerator without cooling. A suitable oxygen-containing gas such as air is supplied to the regenerator by any suitable means such as air compressor 28 through manifold line 27. The air necessary for regeneration may be supplied to the regenerator in several streams, the main quantity of air being supplied through line 34 leading to the base of the regenerator. The remaining air may be supplied through lines 25 and 26 to which lines spent catalyst is introduced by catalyst standpipes 17 and 18 at suitable rates regulated by valves 23 and 24. In place of an oxygen-containing gas an inert fluid conveying medium such as steam, flue gas or the like, may be supplied to lines 25 and 26. The gaseous suspension of spent catalyst in line 25 is carried through a suitable cooler or heat exchanger 29 wherein it is cooled to a relatively low temperature, preferably below the ignition temperature of the carbonaceous deposit, and then passes therefrom through outlet line 31 into the base of the regenerator. A suitable cooling medium is circulated to exchanger 29 through lines 30. The gaseous suspension of catalyst in line 26 is passed directly to the lower portion of the regenerator without cooling. Alternatively, all of the spent catalyst may be passed by line 25 through exchanger 29 and the total stream cooled to a somewhat higher temperature corresponding to that resulting from mixing the streams in lines 31 and 26. The use of two lines as shown is greatly preferred, however, since the flexibility of control is greatly enhanced by diverting a suitable amount from one stream to the other as required.

The quantity of regenerating fluid introduced into the regenerator is maintained within such limits that the upward velocity of the gases through the regenerator is such as to produce a highly concentrated or dense phase of the catalyst and one which is also highly turbulent. The upper level for this dense phase zone A' is indicated by dotted line 35 and the physical characteristics of this phase are similar to those of dense phase zone A present in the reactor.

Zone B', the space in the regenerator above level 35, similar to zone B, constitutes a catalyst-vapor disengaging space, this zone preferably extending a sufficient distance down from outlet 36 that only a relatively small portion of the total catalyst introduced is carried out overhead with the flue gas from zone B' through outlet line 36.

Regenerated catalyst is suitably withdrawn from the regeneration zone by a catalyst withdrawal passageway 37 opening directly into the dense catalyst phase in zone A'. A suitable aerating and stripping medium such as steam is supplied to passageway 37 by line 39 in sufficient amount to strip the withdrawn regenerated catalyst from entrained oxygen-containing gas and maintain the body of catalyst therein in a dense but readily flowable condition. From passageway or compartment 37 spent catalyst is forwarded by catalyst standpipe 7 to the conversion stage as previously described.

Catalyst contained in the flue gas suspension withdrawn overhead through line 36 may be recovered in any suitable arrangement of gas-solid separators, such as cyclones, Cottrell precipitators or the like, and the recovered catalyst returned without substantial cooling of this stream to the regenerator through line 38 or any convenient point in the system such as reactor 12.

Illustrating suitable operating conditions maintained in the regeneration pursuant to the present invention, appended Table II consists of a tabulation of regeneration stage conditions corresponding to an operation in the conversion stage as given in Table I.

Table II is on the basis of no temperature control duty being performed by the catalyst withdrawn overhead through line 36, as for example, when this catalyst is returned through line 38 at substantially the same temperature as withdrawn, or is forwarded to some part of the system other than the regeneration zone, or is negligible in amount. Table IV given hereafter illustrates the application of the invention when the stream of catalyst circulated by way of lines 36 and 38 is utilized to effect a substantial degree of temperature control duty.

TABLE II

| | |
|---|---:|
| Regenerator dimensions: | |
|   (a) Zone A' ht.—ft | 7 |
|       Zone A' dia.—ft | 30.5 |
|   (b) Zone B' ht.—ft | 16 |
|       Zone B' dia.—ft | 30.5 |
| Spent catalyst—lbs./hr | 1,617,355 |
| Cooled spent catalyst (line 25) lbs./hr | 1,294,420 |
| Spent catalyst (line 26) lbs./hr | 322,935 |
| Temperature cooled spent catalyst (line 31) °F | 785 to 740 |
| Temperature spent catalyst (line 26) °F | 940 to 985 |
| Temperature regeneration zone, °F | 1050 |
| Catalyst average concentration, | |
|   (a) Zone A', lbs./cu. ft | 14.8 |

(b) Zone B', lbs./cu. ft_____ 1.0 to 1.5
(c) Catalyst drawoff passageways 37,
    lbs./cu. ft_____ 18.0
(d) Flue gas outlet line 36, grains/cu.
    ft_____ 400
Gas velocity, ft./sec.
  (a) Zone A'_____ 1.62
  (b) Zone B'_____ 1.85
Catalyst contact time (average),
  seconds _____ 120
Regenerator pressure, lbs./sq. in. gauge:
  (a) Inlet to Zone A'_____ 5.4
  (b) Outlet from Zone B'_____ 3.9

As indicated in Table II the temperature of the catalyst in lines 31 and 26 may vary somewhat, dependent upon the extent of the preliminary combustion which occurs to a certain extent when air is employed as the conveying medium through these lines.

Figure 1:
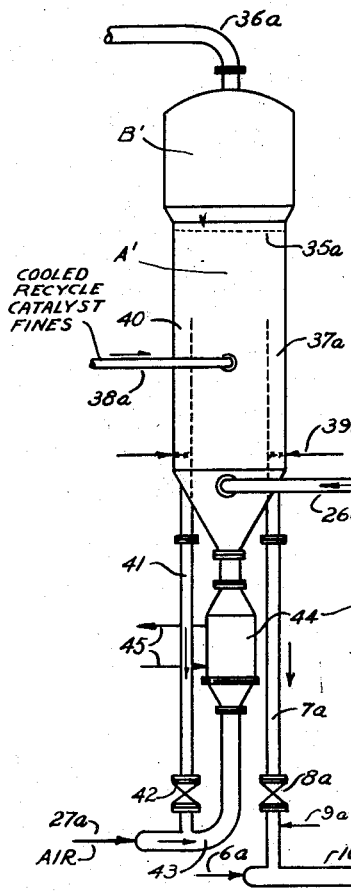
Fig. 1 is a diagrammatic illustration of a suitable arrangement of apparatus and process flow for the practice of the invention as applied to the catalytic conversion of high boiling hydrocarbons to low boiling hydrocarbons within the motor fuel boiling range.
Figure 1:
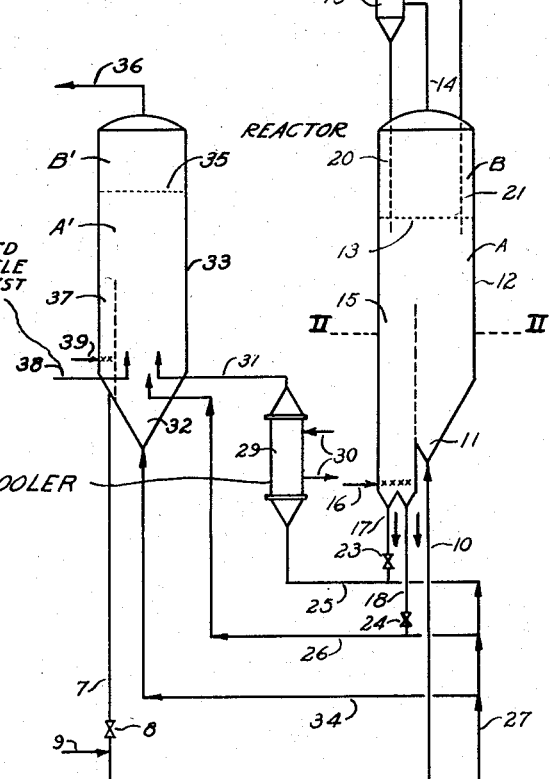
Figure 1:
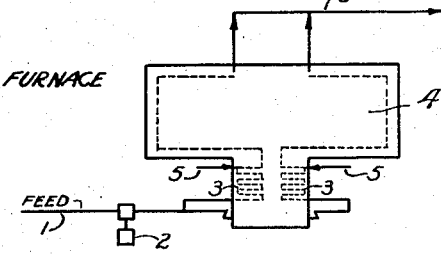

The modification illustrated by Fig. 3 differs from the operation described in connection with Fig. 1 and illustrated by Table II in that a substantial proportion of regenerated catalyst is recirculated to the regeneration zone with intervening cooling of the recycled stream. Elements of Fig. 3 similar in their function to those described in Fig. 1 are indicated by similar reference numerals with the subscript "a", and hence further detailed description of these elements is unnecessary. In this embodiment, all the spent catalyst is forwarded to the regeneration stage in a single stream through line 26a without any substantial or positive cooling of this stream below the temperature at which it is withdrawn from the conversion zone A. Regenerated catalyst to be recycled is withdrawn through a withdrawal passageway or compartment 40. However, if desired, this compartment may be combined with 37a and two catalyst outlet lines leading therefrom be utilized similar to standpipes 17 and 18. An aerating medium such as air or steam is supplied to compartment 40 in amount sufficient to maintain the catalyst therein in a dense but flowable condition. From compartment 40, regenerated catalyst is withdrawn at a rate regulated by valve 42, and introduced to transfer line 43 wherein it is conveyed by air admitted by line 27a through a heat exchanger 44 wherein it is preferably cooled to a relatively low temperature preferably below the ignition temperature of the carbonaceous material, by a suitable cooling medium circulated through lines 45.

The quantity of cooled regenerated catalyst returned through line 43 may be and is preferably supplemented by cooling the catalyst taken overhead through line 36a, and returned after suitable cooling and separation from flue gas, through line 38a. If desired, all the catalyst required for cool recycle to the regeneration zone may be taken overhead through line 36a.

The appended Table III is an example of suitable operating conditions in the application of the modification described with reference to Fig. 3, to a regeneration operation corresponding to the conversion operation outlined in Table I, except that a lower catalyst to oil ratio of 4 to 1 was employed.

TABLE III

Regenerator dimensions:
  (a) Zone A' ht.—ft_____ 27.5
      Zone A' dia.—ft_____ 23
  (b) Zone B' ht.—ft_____ 114
      Zone B' dia.—ft_____ 27

Spent catalyst (line 26a) lbs./hr_____ 623,490
Temperature spent catalyst (line 26a) °F__ 895
Recycled catalyst (line 43) lbs./hr_____ 637,000
Recycled catalyst (line 43) temperature
  °F _____ 595
Recycled catalyst (line 38a) lbs./hr____ 25,000
Recycled catalyst (line 38a) temperature
  °F _____ 595
Temperature regeneration zone, °F_____ 1,000
Catalyst average concentration,
  (a) Zone A', lbs./cu. ft_____ 14.8
  (b) Zone B', lbs./cu. ft_____ 1.0 to 1.5
  (c) Catalyst drawoff passageways 37,
    lbs./cu. ft_____ 18
Gas velocity, ft./sec.
  (a) Zone A'_____ 1.8
  (b) Zone B'_____ 1.7
Catalyst contact time (average), seconds _____ 416
Regenerator pressure, lbs./sq. in. gauge:
  (a) Inlet to Zone A'_____ 7.0
  (b) Outlet from Zone B'_____ 3.0

A further modification of the present invention involves the precooling of both the incoming spent catalyst and a stream of recycled regenerated catalyst. Such a modification, for example, may be practiced utilizing apparatus and process flow as illustrated by Fig. 1 except that the stream of regenerated catalyst withdrawn overhead through line 36 is suitably cooled before returning it through line 38. The appended Table IV illustrates the practice of the invention as so modified, as applied to a regeneration stage corresponding to a conversion stage under the conditions given in Table I.

TABLE IV

Regenerator dimensions:
  (a) Zone A' ht.—ft_____ 7
      Zone A' dia.—ft_____ 30.5
  (b) Zone B' ht.—ft_____ 16
      Zone B' dia.—ft_____ 30.5
Spent catalyst—lbs./hr_____ 1,617,355
Cooled spent catalyst (line 25) lbs./hr__ 1,294,420
Spent catalyst (line 26) lbs./hr_____ 322,935
Regenerated catalyst (line 38) lbs./hr__ 242,000
Temperature cooled spent catalyst
  (line 31) °F_____ 870 to 785
Temperature spent catalyst (line
  26) °F_____ 940 to 985
Temperature regenerated catalyst (line
  38) °F_____ 600
Temperature regeneration zone, °F_____ 1050
Catalyst average concentration,
  (a) Zone A', lbs./cu. ft_____ 14.8
  (b) Zone B', lbs./cu. ft_____ 1.0 to 1.5
  (c) Catalyst drawoff passageways
    37, lbs./cu. ft_____ 18
  (d) Flue gas outlet line 36 grains,
    cu. ft_____ 400
Gas velocity, ft./sec.
  (a) Zone A'_____ 1.62
  (b) Zone B'_____ 1.85
Catalyst contact time (average), seconds _____ 120
Regenerator pressure, lbs./sq. in. gauge:
  (a) Inlet to Zone A'_____ 5.4
  (b) Outlet from Zone B'_____ 3.9

In the different illustrative embodiments of the invention described with reference to Figs. 1 and 2, in each instance the upward velocity of the oxygen-containing gas through the reaction zone is maintained sufficiently low to cause a relatively dense and concentrated catalyst phase to form in the regenerator zone and at a sufficiently high velocity to produce a high degree of turbulence of the catalytic particles comprised in the dense phase with the consequent maintenance of a substantially uniform temperature therein. In addition, the catalyst is introduced to said dense phase after precooling to a temperature substantially lower than the substantially uniform temperature maintained in the regeneration zone. The precooled stream of catalyst entering the regenerator may suitably be cooled to a temperature below the ignition temperature of the carbonaceous deposit thereon without resulting in a subcooling of the regeneration zone to a point at which combustion would either cease or proceed at an unsatisfactorily low rate.

The range of upward gas velocities through the regeneration zone adapted to produce the required highly turbulent dense catalyst phase in this zone is dependent upon such physical characteristics as the particle size and density of the catalyst particles employed and may be readily determined for any particular choice of catalyst or contact agent experimentally. In the case of a powdered or finely-divided cracking catalyst such as the activated clay "Super Filtrol" consisting largely of particles of mixed sizes smaller than 100 microns, the preferred range resides within 0.5 to 6.0 ft./second and preferably within the more restricted range of 1.0 to 3.0 ft./second.

A general advantage flowing through the practice of the invention is the reduction in the quantity of catalyst circulated through the heat exchanger in order to accomplish the desired temperature control. A further highly important advantage is the reduction in the quantity of catalyst cooled and recycled to the regeneration zone with consequent important savings with respect to cost of circulating this catalyst and reduction in the size and cost of the equipment including the regeneration vessel and auxiliary lines.

It is to be understood that the examples described in the foregoing are illustrative only and the scope of the invention is not limited except as required by the claims appended hereto. This application is a continuation of our prior and copending application Serial No. 788,905, filed November 29, 1947, and now abandoned.

We claim:

1. A process for the catalytic cracking of heavy residual oils containing a substantial portion of constituents unvaporizable without decomposition to form lower boiling hydrocarbons in the motor fuel boiling range which comprises passing a stream of said residual oil upward through a cracking zone at a velocity limited to form a dense turbulent bed of catalytic material, introducing a stream of hot regenerated catalyst while said catalyst is at substantially regenerating temperature into said stream of oil while said oil is at an active cracking temperature but not higher than about 900° F. and a portion of which is in the liquid phase, the amount and temperature of the catalyst so introduced being sufficient to heat said oil above 900° F. and partially decompose the unvaporizable constituents contained therein to thereby form a relatively dry suspension of oil vapors and catalyst, maintaining the oil vapors in contact with the catalyst thus suspended therein within said cracking zone for a period sufficient to crack a substantial proportion thereof into motor fuel constituents, continuously separating a stream of finely-divided catalyst containing solid combustible deposits from the oil vapors by withdrawing directly from said dense bed of catalytic material, thereafter fractionating the oil vapors to segregate a motor fuel fraction therefrom, continuously passing a stream of said catalyst separated from said oil vapors into a regenerating zone, passing a stream of oxidizing gas upwardly through said zone at a velocity limited to form a dense, turbulent bed of catalytic material and oxidizing gas in the bottom section of said regenerating zone, burning combustible deposits from the finely-divided catalyst within said regenerating zone to thereby heat said catalyst to a temperature above the temperature maintained in said cracking zone but below the deactivation temperature of said catalyst, the density and turbulence of the catalytic material within said regenerating zone being sufficient to maintain a substantially uniform temperature throughout the regenerating zone, continuously withdrawing a stream of regenerated catalyst directly from said dense bed of catalytic material of the regenerating zone and continuously returning said catalyst to said oil stream while at substantially its regenerating temperature.

2. In the process defined by claim 1, the further improvement in the regeneration of the catalytic material which comprises cooling a portion of the hot regenerated catalyst withdrawn from the regenerating zone to a temperature lower than the ignition temperature of the combustible deposits and substantially lower than said uniform temperature maintained in the regenerating zone and returning the cooled catalyst to the dense turbulent bed of catalytic material in the regenerating zone, whereby the combustion of the solid combustible material is continuously maintained at a substantially uniform temperature not in excess of the maximum safe regeneration temperature.

3. A process for the catalytic cracking of heavy residual oils containing a substantial portion of constituents unvaporizable without decomposition to form lower boiling hydrocarbons in the motor fuel boiling range which comprises passing a stream of said residual oil through a cracking zone, introducing a stream of hot regenerated catalyst while said catalyst is at substantially regenerating temperature into said stream of oil while said oil is at a temperature of about 900° F., the amount and temperature of the catalyst so introduced being sufficient to heat said oil above 900° F. and partially decompose the unvaporizable constituents contained therein to thereby form a relatively dry suspension of oil vapors and catalyst, maintaining the oil vapors in contact with the catalyst thus suspended therein within said cracking zone for a period sufficient to crack at least 30 per cent thereof into motor fuel constituents, continuously separating a stream of finely-divided catalyst containing solid combustible deposits from the oil vapors, thereafter fractionating the oil vapors to segregate a motor fuel fraction therefrom, continuously passing a stream of said catalyst separated from said oil vapors into a regenerating zone, passing a stream of oxidizing gas upwardly through said zone at a velocity limited to form a dense, turbulent bed of catalytic material and oxidizing gas in the bottom section of said regenerating zone, burning combustible deposits from the finely-divided catalyst within said regenerating zone to thereby heat said catalyst to a temperature above the temperature maintained in said cracking zone but below the deactivation temperature of said catalyst, the density and turbulence of the catalytic material within said regenerating zone being sufficient to maintain a substantially uniform temperature throughout the regenerating zone, continuously withdrawing a stream of regenerated catalyst from the regenerating zone and continuously returning said catalyst to said oil stream while at substantially its regenerating temperature.

JOSEPH W. MOORMAN.
LOUIS J. KELLY.

References Cited in the file of this patent

UNITED STATES PATENTS

| Number | Name | Date |
|---|---|---|
| 2,253,486 | Belchetz | Aug. 19, 1941 |
| 2,337,684 | Scheineman | Dec. 28, 1943 |
| 2,341,193 | Scheineman | Feb. 8, 1944 |
| 2,349,574 | Conn | May 23, 1944 |
| 2,362,270 | Hemminger | Nov. 7, 1944 |
| 2,382,755 | Tyson | Aug. 14, 1945 |
| 2,406,555 | Martin | Aug. 27, 1946 |
| 2,421,664 | Tyson | June 3, 1947 |